United States Patent
Fukuoka

(10) Patent No.: US 9,714,053 B2
(45) Date of Patent: Jul. 25, 2017

(54) CONNECTING STRUCTURE OF FRONT APRON AND COWL

(71) Applicant: TOYOTA JIDOSHA KABUSHIKI KAISHA, Toyota-shi, Aichi-ken (JP)

(72) Inventor: Takahiro Fukuoka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 17 days.

(21) Appl. No.: 15/078,658

(22) Filed: Mar. 23, 2016

(65) Prior Publication Data

US 2016/0288839 A1 Oct. 6, 2016

(30) Foreign Application Priority Data

Mar. 30, 2015 (JP) ................................ 2015-070013
Feb. 1, 2016 (JP) ................................ 2016-017153

(51) Int. Cl.
*B62D 24/00* (2006.01)
*B62D 25/08* (2006.01)

(52) U.S. Cl.
CPC ............ *B62D 24/00* (2013.01); *B62D 25/081* (2013.01); *B62D 25/082* (2013.01); *B62D 25/088* (2013.01)

(58) Field of Classification Search
CPC .... B62D 25/082; B62D 21/152; B62D 25/08; B62D 25/084; B62D 25/088; B62D 21/11; B62D 25/04
USPC ...... 296/203.02, 187.09, 193.09, 193.06, 63, 296/210, 205; 180/311, 374, 89.1; 280/781, 784, 788
See application file for complete search history.

(56) References Cited

U.S. PATENT DOCUMENTS

| | | | | |
|---|---|---|---|---|
| 4,819,550 A | * | 4/1989 | Ioka | B62D 25/081 454/147 |
| 7,703,805 B2 | * | 4/2010 | Sasaki | B62D 21/152 280/784 |
| 2009/0243336 A1 | * | 10/2009 | Honji | B62D 21/152 296/187.09 |
| 2011/0115257 A1 | | 5/2011 | Kim | |
| 2011/0272970 A1 | * | 11/2011 | Usuda | B62D 25/14 296/193.09 |
| 2012/0205944 A1 | * | 8/2012 | Kido | B62D 25/088 296/187.09 |
| 2014/0049072 A1 | | 2/2014 | Kim et al. | |

FOREIGN PATENT DOCUMENTS

JP 2008-013068 A 1/2008
KR 20120000920 A 1/2012

* cited by examiner

*Primary Examiner* — Glenn Dayoan
*Assistant Examiner* — Sunsurraye Westbrook
(74) *Attorney, Agent, or Firm* — Oliff PLC

(57) ABSTRACT

A front end portion of a connecting member is fixed to a front apron, and a rear end portion of the connecting member is located vertically higher than the front end portion, and is fixed to a rear portion of a cowl. Therefore, when a rear portion of the front apron is elastically deformed rearward, the front end portion of the connecting member is moved rearward. As a result, upward force is applied obliquely upward, to the front end portion of the connecting member, via the connecting member, and a so-called cancelling moment is applied to the rear portion of the cowl. Thus, rotation of the cowl is curbed, and movement of a suspension tower plate in the vertical direction is curbed.

7 Claims, 6 Drawing Sheets

CONNECTING STRUCTURE OF FRONT APRON AND COWL

INCORPORATION BY REFERENCE

The disclosure of Japanese Patent Application No. 2015-070013 filed on Mar. 30, 2015 including the specification, drawings and abstract and the disclosure of Japanese Patent Application No. 2016-017153 filed on Feb. 1, 2016 including the specification, drawings and abstract are incorporated herein by reference in its entirety.

BACKGROUND

1. Technical Field

The disclosure relates to a connecting structure of a front apron and a cowl.

2. Description of Related Art

Japanese Patent Application Publication No. 2008-013068 (JP 2008-013068 A) discloses a fastening structure of an apron upper member. In this related art, the apron upper member, which provides a part of a front portion of a vehicle body, and a cowl, are fastened to each other with a connecting member, so that a load is effectively transmitted via the connecting member between the apron upper member and the cowl.

However, in the related art, a suspension tower is joined to the inner side of the apron upper member as viewed in the vehicle width direction; therefore, if an upper wall portion of the suspension tower moves in the vertical direction, due to an upward load from a suspension, during running of the vehicle, the cowl may be elastically deformed via the apron upper member and the connecting member.

SUMMARY

The embodiments provide a connecting structure of a front apron and a cowl, which can curb movement of an upper wall portion of a front suspension tower in a vertical direction, when an upward load is applied from a front suspension.

A connecting structure includes a front apron on which a front suspension tower that supports a front suspension of a vehicle is formed, and a cowl located on a rear side of the front apron as viewed in a vehicle front-rear direction. The cowl extends along a vehicle width direction and has a front portion as viewed in the vehicle front-rear direction. The front portion is joined to an upper wall portion of the front suspension tower. The connecting structure further includes a connecting member having a front end portion and a rear end portion as viewed in the vehicle front-rear direction. The front end portion is fixed to the front apron, and the rear end portion is located vertically higher, in a vehicle vertical direction, than the front end portion. The rear end portion of the connecting member is fixed to a rear portion of the cowl as viewed in the vehicle front-rear direction.

In the connecting structure of the front apron and the cowl, the front suspension tower that supports the front suspension of the vehicle is formed on the front apron. On the rear side of the front apron as viewed in the vehicle front-rear direction, the cowl extends in the vehicle width direction, and the front portion of the cowl as viewed in the vehicle front-rear direction is joined to the upper wall portion of the front suspension tower.

The use of the term "joined" herein is not limited to the case where the cowl is directly joined to the front apron, but also includes the case where the cowl is indirectly joined to the front apron via another member or members. The term "joined," which will be used at various locations of this description, is to be interpreted in the same manner (direct or indirect), unless otherwise noted.

Here, the front apron and the cowl are connected with the connecting member. More specifically, the front end portion of the connecting member as viewed in the vehicle front-rear direction is fixed to the front apron, and the rear end portion of the connecting member as viewed in the vehicle front-rear direction is located vertically higher in the vehicle vertical direction, than the front end portion of the connecting member as viewed in the vehicle front-rear direction, and is fixed to the rear portion of the cowl as viewed in the vehicle front-rear direction.

When the upper wall portion of the front suspension tower is pushed upward in the vehicle vertical direction, due to an upward load from a front suspension, the front apron on which the front suspension tower is formed is elastically deformed in the following manner.

Generally, the rear portion of the front apron as viewed in the vehicle front-rear direction and the rear portion of the cowl as viewed in the vehicle front-rear direction are joined (fixed) to a so-called dash panel. Therefore, if the upper wall portion of the suspension tower is pushed upward in the vehicle vertical direction, the front portion of the front apron as viewed in the vehicle front-rear direction is pushed upward in the vehicle vertical direction, to a position vertically higher than the rear portion of the front apron as viewed in the vehicle front-rear direction. As a result, the front apron is elastically deformed so as to be inclined toward the rear side in the vehicle front-rear direction, and the rear portion of the front apron as viewed in the vehicle front-rear direction is elastically deformed in a direction toward the rear side in the vehicle front-rear direction.

According to the disclosed embodiments, the front end portion of the connecting member as viewed in the vehicle front-rear direction is connected to the front apron, and the rear end portion of the connecting member as viewed in the vehicle front-rear direction is located vertically higher, in the vehicle vertical direction, than the front end portion of the connecting member as viewed in the vehicle front-rear direction, and is connected to the rear portion of the cowl as viewed in the vehicle front-rear direction. Namely, the main body portion of the connecting member other than the front end portion and rear end portion of the connecting member as viewed in the vehicle front-rear direction is placed in a condition in which it is inclined upward in the vehicle vertical direction as it extends to the rear side in the vehicle front-rear direction.

Therefore, when the rear portion of the front apron as viewed in the vehicle front-rear direction is elastically deformed toward the rear side in the vehicle front-rear direction, and the location of the front end portion of the connecting member as viewed in the vehicle front-rear direction moves to the rear side as viewed in the vehicle front-rear direction, upward force (F1) is applied obliquely upward to the rear end portion of the connecting member as viewed in the vehicle front-rear direction, via the connecting member.

As described above, if the front apron is pushed upward in the vehicle vertical direction, the front portion of the cowl as viewed in the vehicle front-rear direction is pushed upward in the vehicle vertical direction, and a moment (+M) is applied in a clockwise direction in a vehicle side view as viewed from the left-hand side of the vehicle, to the rear portion of the cowl as viewed in the vehicle front-rear direction.

On the other hand, the upward force (F1) is applied to the rear end portion of the connecting member as viewed in the vehicle front-rear direction, due to elastic deformation of the front apron, so that a moment (−M) is applied in a counterclockwise direction in a vehicle side view as seen from the left-hand side of the vehicle, to the rear portion of the cowl in the vehicle front-rear direction. Namely, the so-called clockwise moment (+M) and counterclockwise moment (−M) are applied to the rear portion of the cowl as viewed in the vehicle front-rear direction, and, consequently, rotation of the cowl is curbed.

In the meantime, when the clockwise moment (+M) is applied to the rear portion of the cowl as viewed in the vehicle front-rear direction, stress (F2) is applied obliquely downward, via the connecting member. As a result, the rear portion of the front apron as viewed in the vehicle front-rear direction is pressed toward the front side in the vehicle front-rear direction, and the amount of elastic deformation toward the vehicle rear side as viewed in the vehicle front-rear direction is reduced. Namely, according to the embodiments, the rigidity of the connecting structure between the front apron and the cowl can be improved; therefore, movement of the upper wall portion of the front suspension tower in the vehicle vertical direction is curbed.

As described above, the connecting structure of the front apron and the cowl has an excellent effect of curbing movement of the upper wall portion of the front suspension tower in the vehicle vertical direction, when an upward load is applied from the front suspension.

In the connecting structure of the front apron and the cowl, the cowl may be formed in a hat shape in a cross-section taken along the vehicle front-rear direction, such that an upper side of the cowl as viewed in the vehicle vertical direction is open, and the rear end portion of the connecting member as viewed in the vehicle front-rear direction may be connected to a portion of the cowl including a ridge line that forms a boundary between a lower wall portion of the cowl and a rear wall portion of the cowl as viewed in the vehicle front-rear direction.

In the connecting structure of the front apron and the cowl as described above, the cowl is formed in a hat shape in the cross-section taken along the vehicle front-rear direction, such that the upper side of the cowl as viewed in the vehicle vertical direction is open.

From the viewpoint of reduction in the weight of the vehicle, for example, the thickness of the cowl may be set to be smaller than that of the front apron. In this case, the rigidity of the cowl is reduced to be lower than that of the front apron. Here, the cowl is formed in a hat shape in the cross-section taken along the vehicle front-rear direction, such that the upper side of the cowl as viewed in the vehicle vertical direction is open. Namely, the cowl includes a front wall portion located in its front portion as viewed in the vehicle front-rear direction, a rear wall portion opposed to the front wall portion and located in its rear portion as viewed in the vehicle front-rear direction, and a lower wall portion that connects lower end portions of the front wall portion and the rear wall portion. Therefore, the rigidity of a portion having the ridge line formed by the lower wall portion and the rear wall portion of the cowl is higher than that of the other portion, in the rear portion of the cowl as viewed in the vehicle front-rear direction.

Accordingly, the rear end portion of the connecting member as viewed in the vehicle front-rear direction is joined to the cowl so as to contact the ridge line provided at the boundary between the lower wall portion and rear wall portion of the cowl. With this arrangement, even when the rigidity of the cowl is lower than that of the front apron, a difference in the rigidity between the cowl and the front apron can be complemented.

The connecting structure of the front apron and the cowl has an excellent effect of increasing the rigidity between the front apron and the cowl, and improving the steering stability.

In the connecting structure of the front apron and the cowl, the rear end portion of the connecting member may be provided with a fixed piece that is bent upward, and the fixed piece may be joined to the rear portion of the cowl so as to contact the ridge line formed at a boundary between the lower wall portion and the rear wall portion of the cowl. The fixed piece may be provided with a bent portion, and the fixed piece may include a first joined portion and a second joined portion. The first joined portion may be joined to the lower wall portion of the cowl, and the second joined portion may be joined to the rear wall portion of the cowl.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
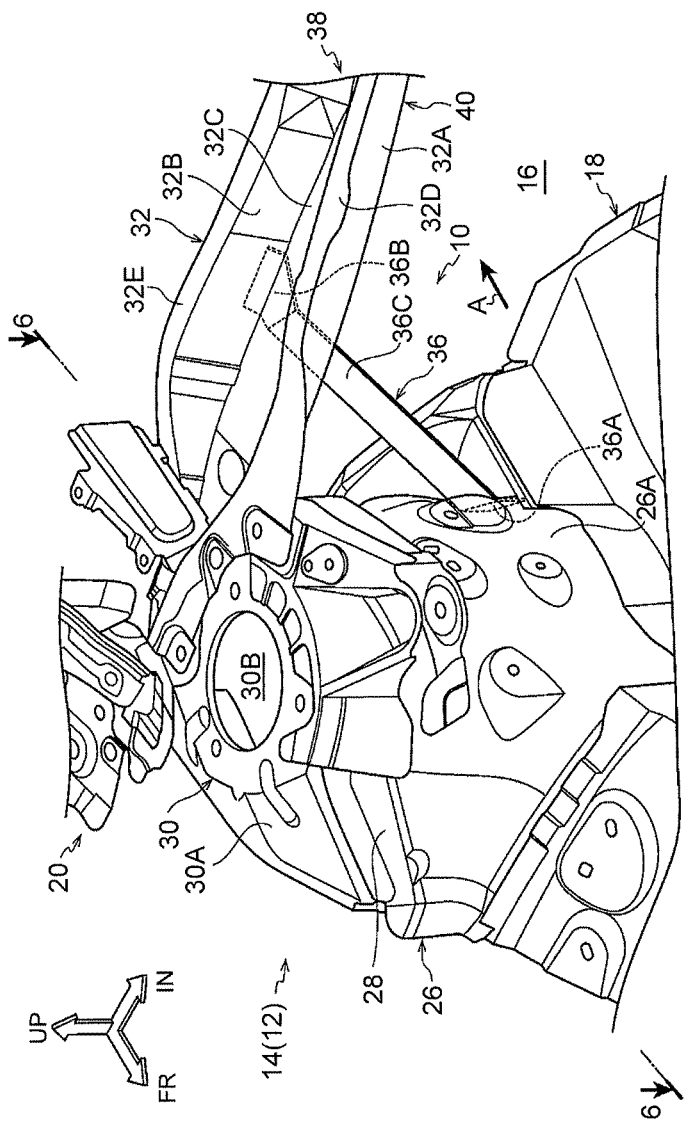
FIG. 1 is a perspective view as seen from the inner side in the vehicle width direction and obliquely from the upper, front side of the vehicle, showing a connecting structure of a front apron and a cowl according to one embodiment.

Referring to FIG. 1 through FIG. 6, a connecting structure of a front apron and a cowl according to one embodiment will be described. Arrow FR shown as needed in the drawings indicates the front side in the vehicle front-rear direction (which will be called "vehicle front side"), and arrow UP indicates the upper side in the vehicle vertical direction (which will be called "vehicle upper side"), while arrow IN indicates the inner side in the vehicle width direction. When a certain direction is expressed simply using any of front and rear, up and down, and right and left, it indicates a corresponding one of the front and rear of the vehicle front-rear direction, up and down of the vehicle vertical direction, and the right and left in the case where one faces in the front direction, unless otherwise noted.

(Configuration of Connecting Structure of Front Apron and Cowl) Initially, the overall configuration of a vehicle-body front portion 14 of a vehicle body 12 in which the connecting structure 10 of the front apron and the cowl according to this embodiment is used will be described with reference to FIG. 1 and FIG. 3. A power unit chamber 16 in which a power unit (not shown) is housed is provided in the vehicle-body front portion 14. A pair of right and left front side members 18 that constitute the framework of the vehicle body 12 are installed along the vehicle front-rear direction, at the opposite outer sides of the power unit chamber 16 as viewed in the vehicle width direction.

The front side member 18 includes a front portion 18A that extends in the vehicle front-rear direction, and a kick portion 18B that is inclined from the vehicle rear side of the front portion 18A toward the vehicle rear, lower side. Also, a pair of right and left front pillars 20 are installed along the vehicle vertical direction, on the opposite sides of the front side members 18 as viewed in the vehicle width direction and on the vehicle upper side of the front side members 18.

A pair of right and left apron upper members 22 are installed along the vehicle front-rear direction, on the opposite outer sides of the front side members 18 as viewed in the vehicle width direction and on the vehicle upper side of the front side members 18, such that each of the apron upper members 22 extends from a vertically middle portion of the corresponding front pillar 20 toward the front of the vehicle. Each of the front side members 18, front pillars 20, and the apron upper members 22 has a closed cross-sectional structure (that is, defines a hollow chamber).

Also, a dash panel 24 that separates the power unit chamber 16 from a vehicle interior 23 is placed on the vehicle rear side of the front side members 18, between the pair of right and left front pillars 20. A front apron 26 is provided on the vehicle front side of the dash panel 24, between the apron upper member 22 and the front side member 18.

An outer edge portion of the front apron 26 along the vehicle width direction is joined to the apron upper member 22 by a joining means (or joint), such as spot welding, and an inner edge portion of the front apron 26 along the vehicle width direction is joined to the front side member 18 by a joining means (or joint), such as spot welding. Also, a front end portion of the front apron 26 is joined to a reinforcement member (not shown) that bridges or extends between the apron upper member 22 and the front side member 18, for example, by a joining means (or joint), such as spot welding. A rear end portion of the front apron 26 is joined to the dash panel 24 by a joining means (or joint), such as spot welding.

Here, the front apron 26 is formed by press working, and is shaped to protrude toward the vehicle upper side. A front suspension tower (which will be called "suspension tower portion") 28 is formed on a rear portion of the front apron 26. Since the apron upper member 22 is located on the vehicle upper side of the front side member 18, as described above, the outer edge portion of the front apron 26 along the vehicle width direction is located at a higher level than the inner edge portion of the front apron 26 along the vehicle width direction. Therefore, a vertical wall portion 26A is formed in an inner portion of the front apron 26 as viewed in the vehicle width direction, so as to fill a difference (and extend) between the apron upper member 22 and the front side member 18. Namely, the rear portion of the front apron 26 has a generally inverted L shape as a cross-sectional shape when viewed from the vehicle front side in a condition where it is cut along the vehicle width direction.

Although not illustrated in the drawings, a shock absorber and a spring, which constitute a suspension (not shown) for supporting a front wheel housed in a wheel housing, are housed inside the front apron 26. Also, on the rear portion of the front apron 26, a front suspension tower plate (which will be called "suspension tower plate") 30 serving as an upper wall portion is provided on an upper surface (not shown) of the suspension tower portion 28.

The suspension tower plate 30 is formed of a steel material in the shape of a disc or a cylinder with a bottom, and is joined to t the suspension tower portion 28 by a joining means (or joint), such as welding. Also, the suspension tower plate 30 is provided with an extended portion 30A that is extended outward in the vehicle width direction. The extended portion 30A is joined to the apron upper member 22, so that the suspension tower plate 30 is also fixed to the apron upper member 22.

A through-hole 30B is formed in a central portion of the suspension tower plate 30, more specifically, its portion opposed to the shock absorber and the spring (not shown). Then, a fixing portion (not shown) is provided in a peripheral portion of the through-hole 30B, and an upper support (not shown) provided on the upper side of the spring is supported by the suspension tower plate 30, by means of the fixing portion. In the case where a coilover is used as the suspension, the fixing portion of the suspension tower plate 30 may be changed as needed.

On the vehicle rear side of the front apron 26 and the vehicle front side of the dash panel 24, a cowl 32 bridges or extends between the right and left front pillars 20. The cowl 32 is formed in the shape of a hat, which is open at the vehicle upper side in a cross-section taken along the vehicle front-rear direction.

More specifically, the cowl 32 has, as main parts, a front wall portion 32A that is located in a front portion thereof and extends in the vehicle width direction, a rear wall portion 32B that is located on the rear side of the front wall portion 32A while being opposed to the front wall portion 32A and extends in the vehicle width direction, and a lower wall portion 32C that connects lower end portions of the front wall portion 32A and the rear wall portion 32B. A ridge line P is formed at a boundary between the front wall portion 32A and lower wall portion 32C of the cowl 32, and a ridge line Q is formed at a boundary between the lower wall portion 32C and the rear wall portion 32B.

A stepped portion 32A1 (see FIG. 5) is provided in a vertically middle portion of the front wall portion 32A of the cowl 32. Further, a front flange portion 32D that projects outward from an upper end portion of the front wall portion 32A toward the front of the vehicle is formed, and the front flange portion 32D is joined to the upper surface (the upper surface (not shown) of the suspension tower portion 28) of the front apron 26 via the suspension tower plate 30 by a joining means (or joint), such as spot welding.

Also, a rear flange portion 32E that projects outward from an upper end portion of the rear wall portion 32B of the cowl 32 toward the rear of the vehicle is formed, and the rear flange portion 32E is joined to the upper end side of the dash panel 24 by a joining means (or joint), such as spot welding. The cowl 32 cooperates with the right and left front pillars 20 and a roof head portion (not shown) to support a windshield glass (not shown).

The use of the term "joined" in the above description is not limited to the case where the cowl 32 is directly joined to the front apron 26 and the dash panel 24, but also includes the case where the cowl 32 is indirectly joined to the front apron 26 and the dash panel 24, via another member or members.

Figure 2:
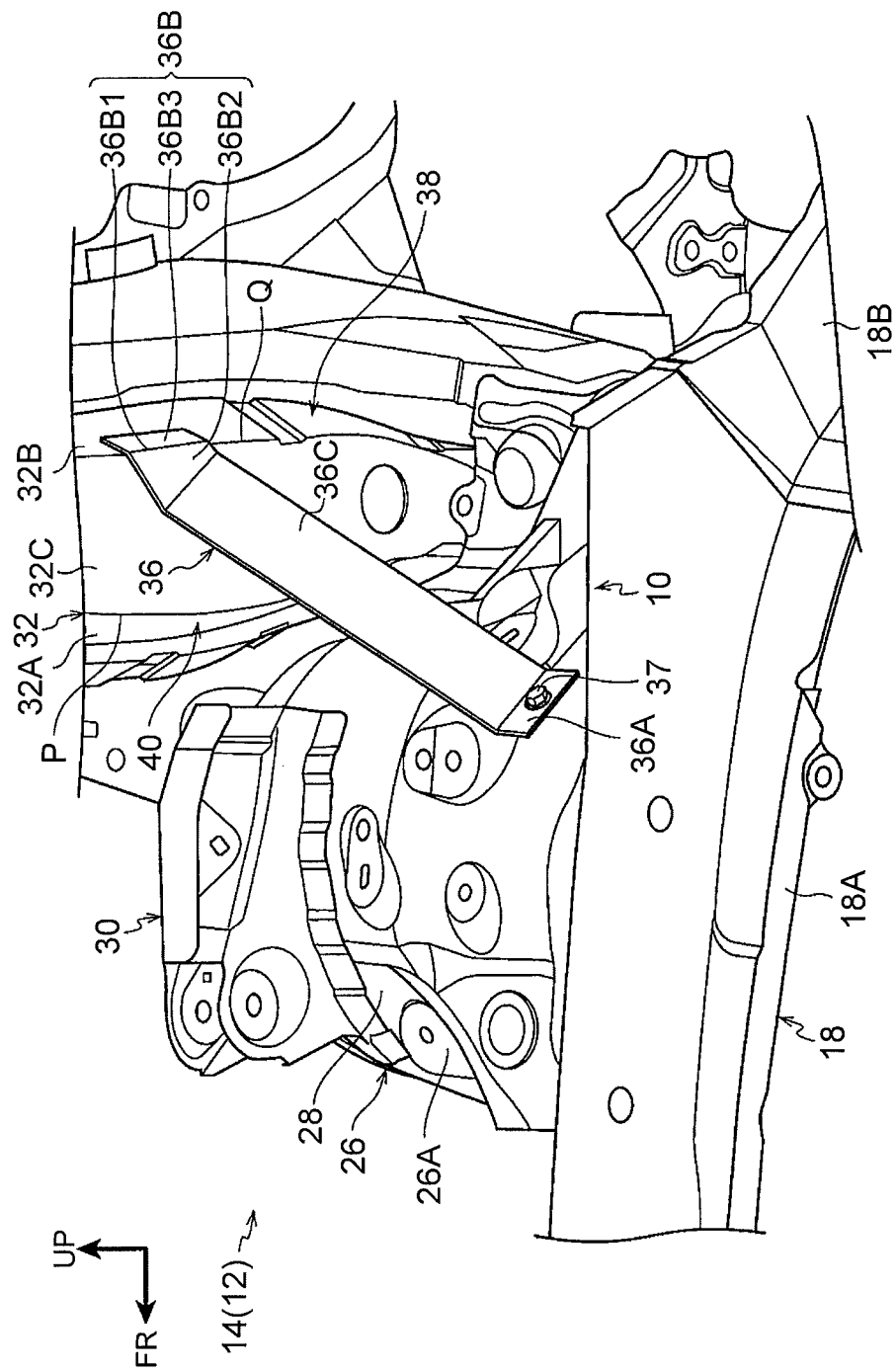
FIG. 2 is a perspective view as seen from the inner side in the vehicle width direction and obliquely from the lower, rear side of the vehicle, showing the connecting structure of the front apron and the cowl according to the embodiment of FIG. 1.
Figure 3:
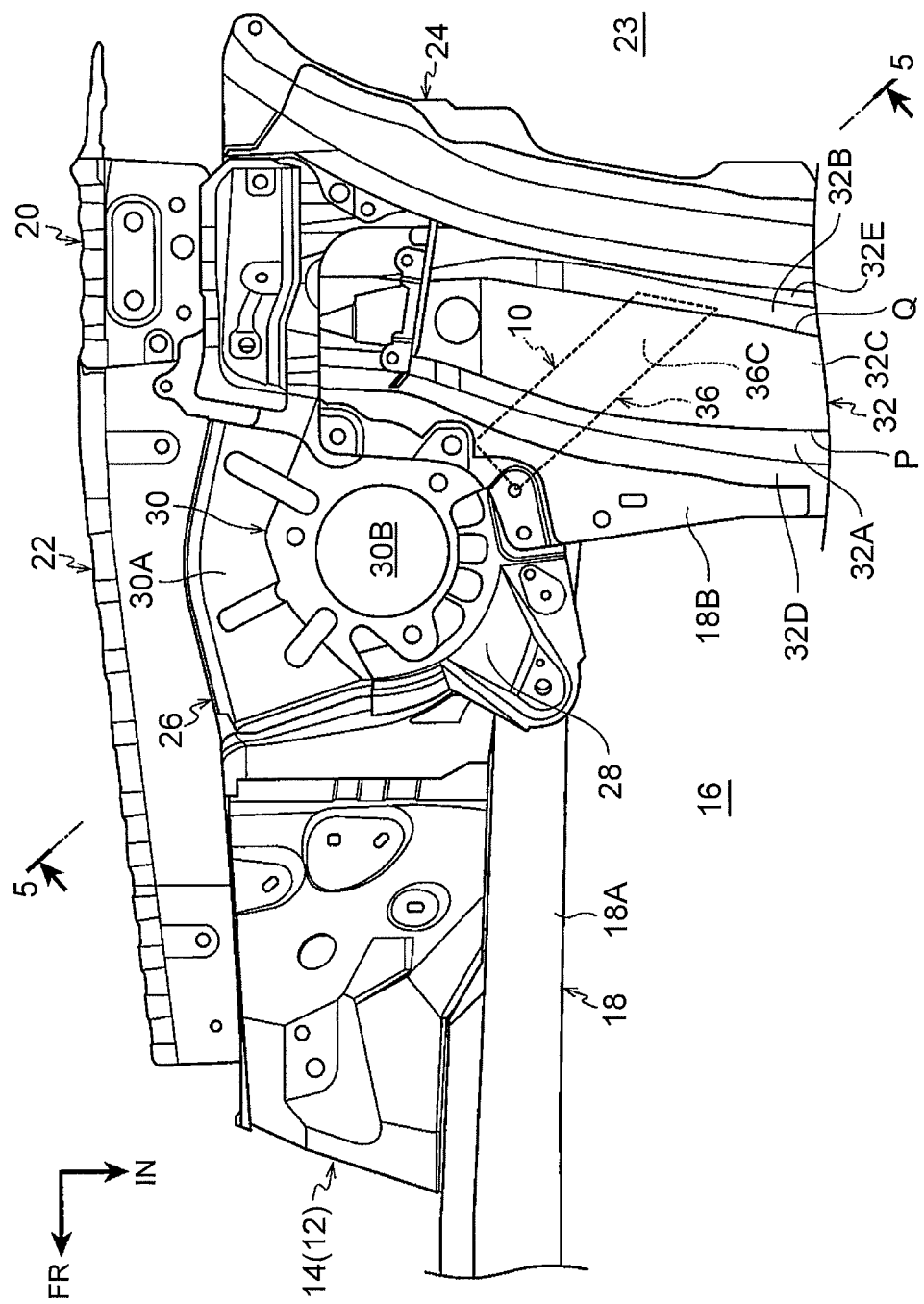
FIG. 3 is a plan view showing the connecting structure of the front apron and the cowl according to the embodiment of FIG. 1.
Figure 4:
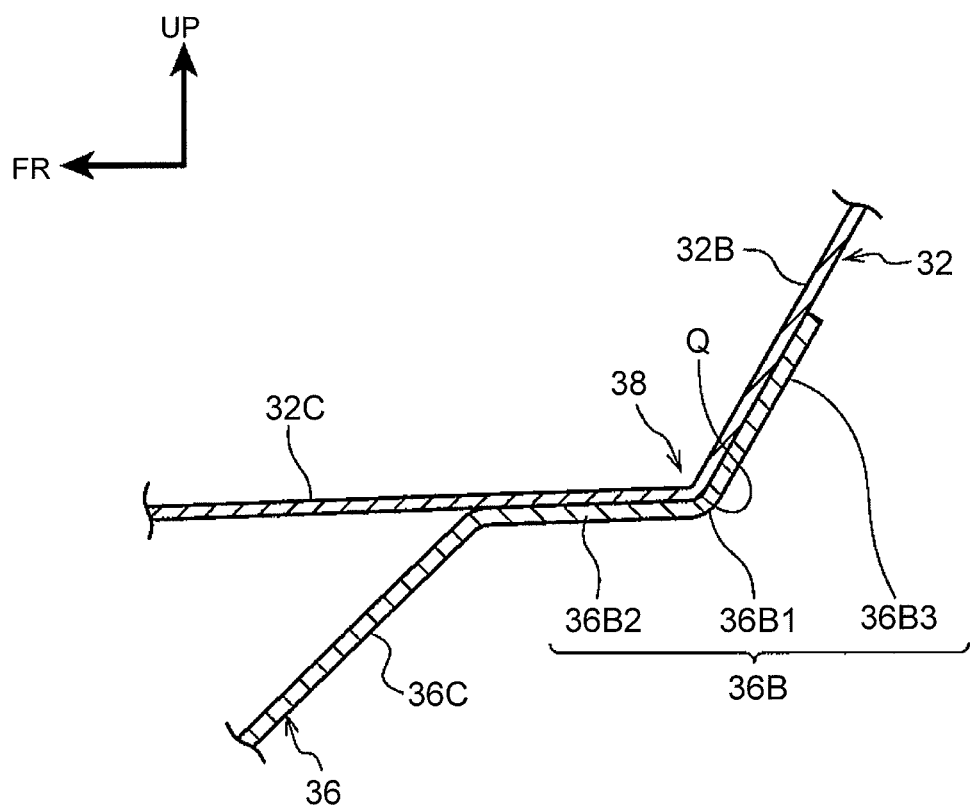
FIG. 4 is an enlarged, cross-sectional view of a principle part of the connecting structure of the front apron and the cowl according to the embodiment of FIG. 1.

As shown in FIG. 2, FIG. 3 and FIG. 4, one longitudinal end portion (front end portion) of a band-like connecting member 36 formed of a steel material is joined to a rear portion of the vertical wall portion 26A of the front apron 26. A fixed piece 36A that is bent toward the vehicle lower side is provided in a front end portion of the connecting member 36. The fixed piece 36A is joined to the front apron 26 by a joining means (or joint), such as a bolt 37. Also, a fixed piece 36B that is bent toward the vehicle upper side is provided in the other longitudinal end portion (rear end portion) of the connecting member 36. The fixed piece 36B is joined to a rear portion of the cowl 32 with an adhesive, or the like.

Here, the fixed piece 36B is joined to the rear portion of the cowl 32, so as to contact the ridge line Q formed at the boundary between the lower wall portion 32C and rear wall portion 32B of the cowl 32. Therefore, a bent portion 36B1 is provided in the fixed piece 36B, and the fixed piece 36B includes a joined portion 36B2 and a joined portion 36B3. Then, the joined portion 36B2 is joined to the lower wall portion 32C of the cowl 32, and the joined portion 36B3 is joined to the rear wall portion 32B.

The connecting member 36 further includes a main body portion 36C located between the fixed pieces 36A, 36B. The main body portion 36C is placed in a condition where it is inclined toward the vehicle upper side as it extends to the vehicle rear side. Needless to say, the fixed piece 36B may be joined to the cowl 32 by a joining means (or joint), such as spot welding.

(Operation and Effect of the Connecting Structure of Front Apron and Cowl) Next, the operation and effect of the vehicle-body front portion 14 of the vehicle body 12 in which the connecting structure 10 of the front apron and the cowl according to this embodiment is used will be described with reference to FIG. 3 to FIG. 6.

Figure 5:
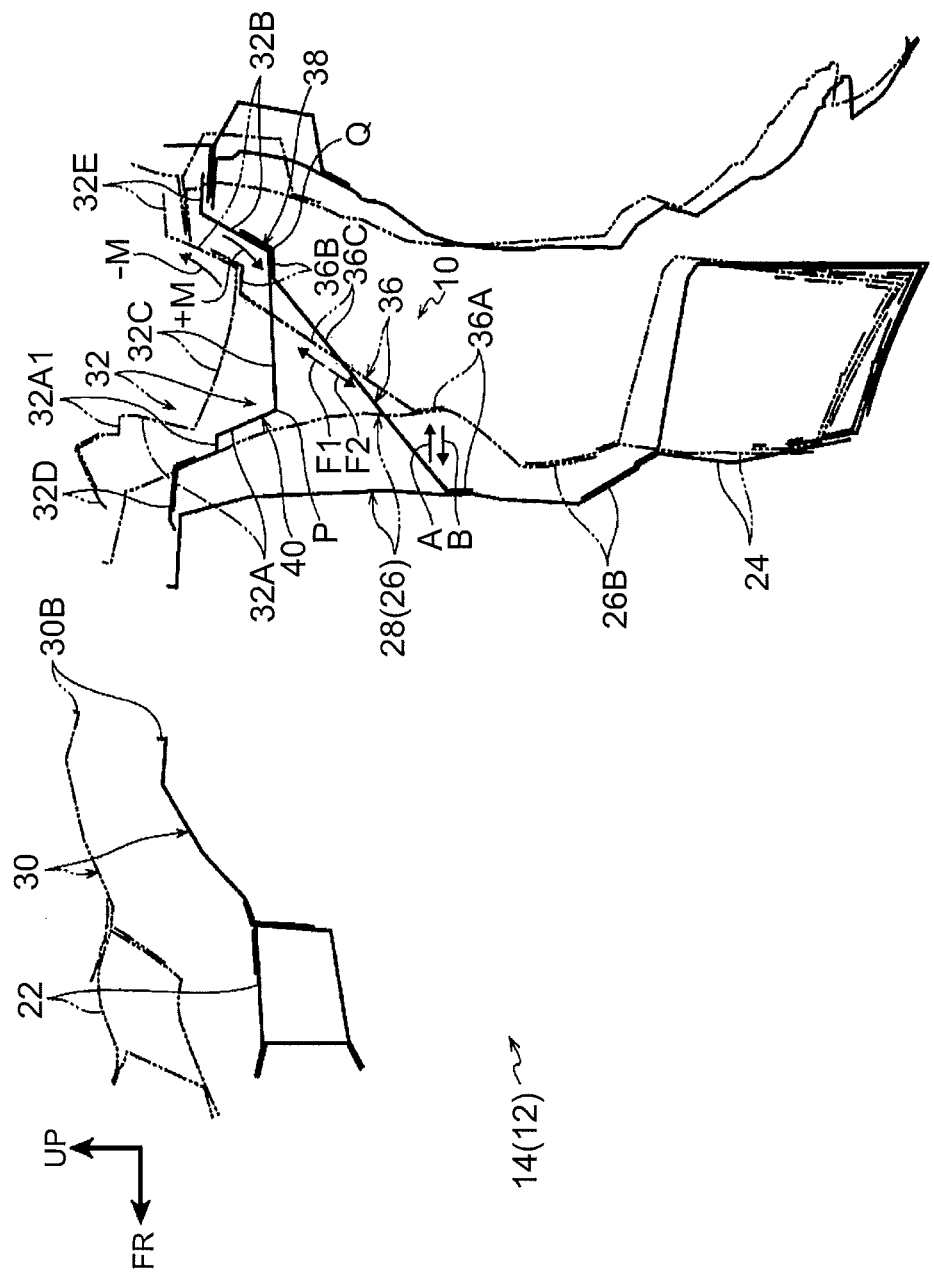
FIG. 5 is a cross-sectional view taken along line 5-5 of FIG. 3, which is useful for explaining an action of the connecting structure of the front apron and the cowl according to the embodiment, wherein solid lines indicate a condition before elastic deformation, and two-dot chain lines indicate a condition after elastic deformation.

In this embodiment, the front flange portion 32D of the cowl 32 is joined to the suspension tower plate 30, as indicated by solid lines in FIG. 5. Also, the rear flange portion 32E of the cowl 32 is joined to the dash panel 24. Further, the fixed piece 36A of the connecting member 36 is joined to a rear portion 44 of the vertical wall portion 26A of the front apron 26, and the fixed piece 36B of the connecting member 36 is joined to a rear portion 38 of the cowl 32.

When the suspension tower plate 30 is pushed upward, as indicated by a two-dot chain line in FIG. 5, due to an upward load from a front suspension (not shown) during running of the vehicle, the suspension tower portion 28 (front apron 26) on which the suspension tower plate 30 is mounted is pushed upward.

Figure 6:
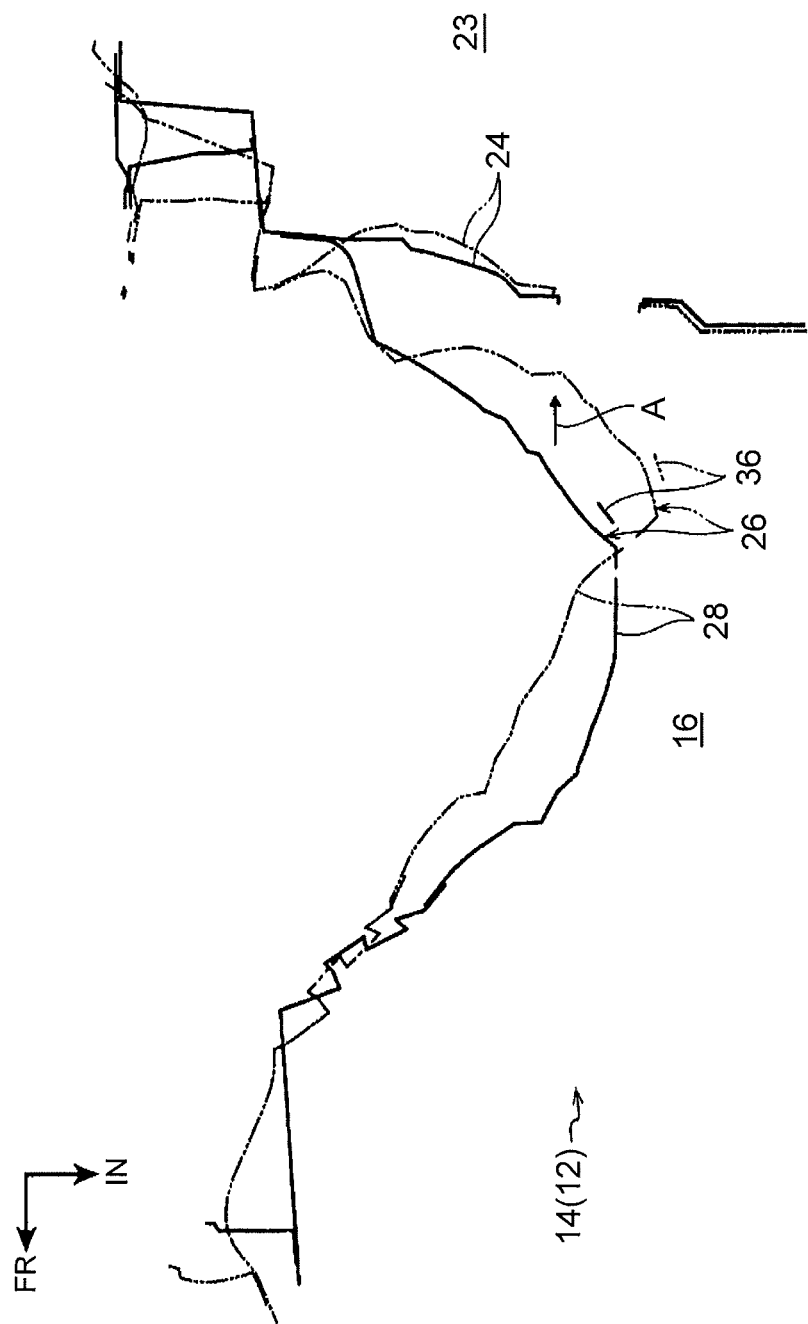
FIG. 6 is a cross-sectional view taken along line 6-6 of FIG. 1, which is useful for explaining an action of the connecting structure of the front apron and the cowl according to the embodiment, wherein solid lines indicate a condition before elastic deformation, and two-dot chain lines indicate a condition after elastic deformation.

Here, as shown in FIG. 3, the suspension tower portion 28 is provided in a corner portion of the power unit chamber 16, and a rear end portion 26B of the front apron 26 provided with the suspension tower portion 28 is joined (fixed) to the dash panel 24, as indicated by solid lines in FIG. 5 and FIG. 6.

Therefore, when the suspension tower portion 28 of the front apron 26 is pushed upward, a front portion of the front apron 26 is pushed upward, to a vertically higher level than a rear portion thereof. As a result, the front apron 26 is elastically deformed so as to be inclined toward the vehicle rear side, and the rear portion 44 of the front apron 26 is elastically deformed toward the vehicle rear side, as indicated by arrow A.

In this embodiment, the fixed piece 36A in the front end portion of the connecting member 36 is connected to the front apron 26, and the fixed piece 36B in the rear end portion of the connecting member 36 is located vertically higher than the fixed piece 36A, and is coupled to the rear portion 38 of the cowl 32. Namely, the main body portion 36C of the connecting member 36 is placed in a condition where it is inclined toward the vehicle upper side as it extends to the vehicle rear side. Therefore, as indicated by two-dot chain lines in FIG. 5, the rear portion 44 of the front apron 26 is elastically deformed toward the vehicle rear side, and, if the position of the fixed piece 36A of the connecting member 36 is moved to the vehicle rear side, upward force (F1) that pushes the cowl 32 obliquely upward via the connecting member 36 is applied to the fixed piece 36B of the connecting member 36.

The rear portion 38 of the cowl 32 is joined to the dash panel 24; therefore, if the front apron 26 is pushed upward, the front portion 40 of the cowl 32 is pushed upward. At this time, a moment (+M) is applied to the rear portion 38 of the cowl 32 in the clockwise direction in a vehicle side view as seen from the left-hand side of the vehicle.

On the other hand, the upward force (F1) that pushes the cowl 32 upward is applied to the rear end portion of the connecting member 36, due to elastic deformation of the front apron 26, so that a moment (−M) is applied to the rear portion 38 of the cowl 32 in a counterclockwise direction in a vehicle side view as seen from the left-hand side of the vehicle. Namely, the clockwise moment (+M) and the counterclockwise moment (−M) are applied to the rear portion 38 of the cowl 32, so that a so-called cancelling moment is applied, and, consequently, rotation of the cowl 32 is curbed.

In the meantime, when the clockwise moment (+M) is applied to the rear portion 38 of the cowl 32, stress (F2) that pushes the front apron 26 obliquely downward is applied, via the connecting member 36. As a result, the rear portion 44 of the front apron 26 is pressed to the vehicle front side as indicated by arrow B, and the amount of elastic deformation toward the vehicle rear side is reduced.

Namely, according to this embodiment, the rigidity of the connecting structure between the front apron 26 and the cowl 32 can be improved. Consequently, movement of the suspension tower plate 30 in the vertical direction is curbed. Thus, displacement of the suspension tower plate 30 in the vertical direction is curbed, so that the steering stability can be improved.

From the viewpoint of reduction in the weight of the vehicle, for example, the thickness of the cowl 32 may be set to be smaller than that of the front apron 26. In this case, the rigidity of the cowl 32 is reduced to be lower than that of the front apron 26. Since the cowl 32 is formed in a hat shape in the cross-section taken along the vehicle front-rear direction, the rigidity of a portion having the ridge line Q formed by the lower wall portion 32C and the rear wall portion 32B of the cowl 32 is higher than that of the other portion in the rear portion 38 of the cowl 32.

Accordingly, in this embodiment, the fixed piece 36B of the connecting member 36 may be joined to the rear portion 38 of the cowl 32 so as to contact the ridge line Q of the cowl 32. With this arrangement, even if the rigidity of the cowl 32 is lower than that of the front apron 26, a difference in the rigidity between the cowl 32 and the front apron 26 can be complemented. It is, however, to be noted that the fixed piece 36B of the connecting member 36 is only required to be joined to the rear portion 38 of the cowl 32, and is not necessarily required to contact the ridge line Q.

While the front apron 26 is formed from a single plate by press working in the illustrated embodiment, the embodiments are not limited to this arrangement. For example, two or more plates may be joined to each other by a joining means (or joint), such as spot welding, so as to form the front apron 26 as a single plate.

Also, the method of forming the front apron 26 is not limited to press working, but the front apron 26 may be formed by casting. In this embodiment, the suspension tower plate 30 is formed separately from the front apron 26, and the suspension tower plate 30 is mounted on the front apron 26. However, the suspension tower plate may be formed integrally with the front apron, with an aluminum die-cast, although not illustrated in the drawings. Namely, the upper surface of the suspension tower portion 28 itself provides an upper wall portion of the suspension tower portion 28.

What is claimed is:

1. A connecting structure comprising:
   a front apron on which a front suspension tower that supports a front suspension of a vehicle is formed;
   a cowl located on a rear side of the front apron as viewed in a vehicle front-rear direction, the cowl extending along a vehicle width direction and having a front portion as viewed in the vehicle front-rear direction, the front portion being joined to an upper wall portion of the front suspension tower; and
   a connecting member having a front end portion and a rear end portion which are at opposite ends of the connecting member as viewed in the vehicle front-rear direction, the front end portion being fixed to the front apron, the rear end portion being located vertically higher, in a vehicle vertical direction, than the front end portion, the rear end portion of the connecting member being fixed to a rear portion of the cowl as viewed in the vehicle front-rear direction.

2. The connecting structure according to claim 1, wherein:
   the cowl is formed in a hat shape in a cross-section taken along the vehicle front-rear direction, such that an upper side of the cowl as viewed in the vehicle vertical direction is open; and
   the rear end portion of the connecting member is connected to a portion of the cowl including a ridge line that forms a boundary between a lower wall portion of the cowl and a rear wall portion of the cowl as viewed in the vehicle front-rear direction.

3. The connecting structure according to claim 2, wherein:
   the rear end portion of the connecting member is provided with a fixed piece that is bent upward;
   the fixed piece is joined to the rear portion of the cowl so as to contact the ridge line; and
   the fixed piece is provided with a bent portion, and the fixed piece includes a first joined portion and a second joined portion, the first joined portion being joined to the lower wall portion of the cowl, the second joined portion being joined to the rear wall portion of the cowl.

4. The connecting structure according to claim 1, wherein:
   the front end portion of the connecting member is fixed to a vertical sidewall portion of the front apron which is formed in an inner portion of the front apron in the vehicle width direction.

5. A connecting structure comprising:
   a front apron on which a front suspension tower that supports a front suspension of a vehicle is formed;
   a cowl located on a rear side of the front apron as viewed in a vehicle front-rear direction, the cowl extending along a vehicle width direction and having a front portion as viewed in the vehicle front-rear direction, the front portion being joined to an upper wall portion of the front suspension tower; and
   a connecting member having a front end portion and a rear end portion as viewed in the vehicle front-rear direction, the front end portion being fixed to a vertical sidewall portion of the front apron which is formed in an inner portion of the front apron in the vehicle width direction, the rear end portion being located vertically higher, in a vehicle vertical direction, than the front end portion, the rear end portion of the connecting member being fixed to a rear portion of the cowl as viewed in the vehicle front-rear direction.

6. The connecting structure according to claim 5, wherein:
   the cowl is formed in a hat shape in a cross-section taken along the vehicle front-rear direction, such that an upper side of the cowl as viewed in the vehicle vertical direction is open; and
   the rear end portion of the connecting member is connected to a portion of the cowl including a ridge line that forms a boundary between a lower wall portion of the cowl and a rear wall portion of the cowl as viewed in the vehicle front-rear direction.

7. The connecting structure according to claim 6, wherein:
   the rear end portion of the connecting member is provided with a fixed piece that is bent upward;
   the fixed piece is joined to the rear portion of the cowl so as to contact the ridge line; and
   the fixed piece is provided with a bent portion, and the fixed piece includes a first joined portion and a second joined portion, the first joined portion being joined to the lower wall portion of the cowl, the second joined portion being joined to the rear wall portion of the cowl.

* * * * *